United States Patent
Bond et al.

(10) Patent No.: US 7,991,658 B2
(45) Date of Patent: Aug. 2, 2011

(54) ACCOUNTING PROCESS

(75) Inventors: Warren Bond, Durban (ZA); Bartholomeus Van Der Walt, Bloemfontein (ZA)

(73) Assignee: Qwill SA (PTY) Limited, Craighall (ZA)

(*) Notice: Subject to any disclaimer, the term of this patent is extended or adjusted under 35 U.S.C. 154(b) by 633 days.

(21) Appl. No.: 11/662,653

(22) PCT Filed: Dec. 24, 2004

(86) PCT No.: PCT/ZA2004/000163
§ 371 (c)(1), (2), (4) Date: Jan. 31, 2008

(87) PCT Pub. No.: WO2006/032063
PCT Pub. Date: Mar. 23, 2006

(65) Prior Publication Data
US 2008/0262949 A1    Oct. 23, 2008

(30) Foreign Application Priority Data
Sep. 15, 2004 (ZA) ................. 2004/07392

(51) Int. Cl.
G07B 17/00 (2006.01)
G07F 19/00 (2006.01)
G06Q 30/00 (2006.01)

(52) U.S. Cl. .......................... 705/30; 705/26
(58) Field of Classification Search ............. 705/30, 705/26
See application file for complete search history.

(56) References Cited

U.S. PATENT DOCUMENTS

| | | | | |
|---|---|---|---|---|
| 5,842,185 | A * | 11/1998 | Chancey et al. | 705/40 |
| 6,792,422 | B1 * | 9/2004 | Stride et al. | 707/693 |
| 2001/0029475 | A1 * | 10/2001 | Boicourt et al. | 705/30 |
| 2001/0044762 | A1 * | 11/2001 | Nault | 705/30 |
| 2002/0026396 | A1 * | 2/2002 | Dent et al. | 705/35 |
| 2002/0173986 | A1 * | 11/2002 | Lehew et al. | 705/1 |
| 2004/0088232 | A1 * | 5/2004 | Minnis, Jr. | 705/30 |
| 2004/0098338 | A1 * | 5/2004 | Uehara et al. | 705/42 |
| 2004/0215546 | A1 * | 10/2004 | Nelson | 705/36 |
| 2005/0098623 | A1 * | 5/2005 | Kim | 235/380 |

* cited by examiner

Primary Examiner — Matthew S Gart
Assistant Examiner — Ig T An
(74) Attorney, Agent, or Firm — Young & Thompson

(57) ABSTRACT

A computerized accounting process and system capturing customer transaction data, creating transaction codes or references at the time of the transaction and generating accounting reports for the customer.

24 Claims, 6 Drawing Sheets

FIGURE 6

ACCOUNTING PROCESS

BACKGROUND OF THE INVENTION

This invention relates to a business process for producing accounting information, as well as apparatus and software for performing the business process.

DESCRIPTION OF THE RELATED ART

Currently, the source documents forming the basis of all accounting procedure, namely bank deposits and withdrawals, whether by transfer, check or cash transaction, are captured on one hand by the banking institution or institutions facilitating the transaction, and on the other hand by the person or business (client) making the transaction. This duplicate capturing is time consuming and prone to human error and at least on the client side, subject to delay. Essentially, banks, accountants and business duplicate information into different financial systems. These functions cost all parties concerned a considerable amount of time and man hours with concomitant increase in service or running costs as well as improved accuracy.

SUMMARY OF THE INVENTION

It is an object of this invention to provide a business process as well as software and a system for preventing the duplication of this basic bookkeeping function and in so doing reducing accounting fees, reducing time spent by bookkeeping personnel and permit more effective management of expenses. A further objective would be to permit a banking institution to produce detailed and summarized financial information such as a statement of income and expenditure, a cash flow statement and a trial balance for a client at any time and prepare financial statements very quickly if required or to enable the client to do so with the bank's assistance.

According to the invention, an accounting process to be performed on or with the aid of a computer comprises the following steps:
  capturing of certain transaction data by a banking institution,
  creating and/or allocating one or more transaction codes or reference to the transaction at the time of the transaction, and
  importing and/or exporting the captured data and code into one or more accounting software programs for generation of accounting reports.

Transaction data contemplated for capture includes data found on source documents including but not limited to cheque stubs, internet payment advice, invoices, bank statements, deposit and withdrawal slips or funds transfer slips as well as banking devices, for example, credit card terminals, ATM transactions, as well as data emanating or originating from the following processes, systems and devices used to carry out financial transactions.
Internet Banking Website
Website
HTML enabled software
E-Mail
Payment Transaction Acquiring device
Point of Sale Terminal
Magstripe Card Reader
Debit Cards
Credit Cards
Smartcards
Bank Issued Cards
Loyalty Cards
GSM Devices
GPRS Devices
3G Devices
Mobile Phones
Mobile Phone technology enabled readers
SIM Cards
SIM Card Readers
Fixed Line Phone
SMS
MMS
Set Top Box
Debit Order
Stop Order
Cheques
Cheque Requisitions
Deposit Slips
EFT Slips
Inter Account Transfer Slips
Bank Generated Transactions
Bank Draft
Electronic Payment Systems
ATM's
Bank—over the counter transactions
Ban—Virtual Transactions
Telex
Swift
Bank Systems
Clearing Houses
Networks Whether data is imported or exported will depend on the point of capture of the data, the location of the accounting program and/or accounting reports relative to the point of capture, and the method of transferring the data to the general ledger or other accounting reports.

In the preferred embodiment of the invention, a first accounting software program is located on a computer or the like device linked to the bank computer system and the software program may perform a synchronizing of the data to ensure compatibility with a variety of accounting programs, prior to exporting the data to the client accounting program and/or the bank accounting program. This may be required where the system of the invention is implemented to current or pre-existing system, computer or devices.

In this embodiment of the invention, the client's general ledger and trial balance may be produced by the bank and retained for its uses, including keeping up-to-date financial statements and ratios for continuous evaluation of client's credit-worthiness.

The client may receive the formatted transaction data for generation of a general ledger and trial balance by its own accounting software—the typical situation for a small to medium enterprise.

Alternatively, the client as an individual or small business may receive a general ledger and trial balance for use by its own accounting personnel for generation of management documents to financial statements, or even full financial statements generated by the bank.

Data and/or accounting information may be transferred to the client by internet, e-mail, sms, mms or similar data transfer means, while bank systems may be adapted to collate data received as a result of transactions carried out in the bank, at automatic teller machines, by telephone or mobile telephone and internet transaction as well as receiving customer information from a customer accounting system, for example journals, depreciation, corrections and the like.

BRIEF DESCRIPTION OF THE DRAWINGS

FIGS. 5-6 illustrate a specific example of a check as a source document.

DESCRIPTION OF THE PREFERRED EMBODIMENTS

Figure 1:
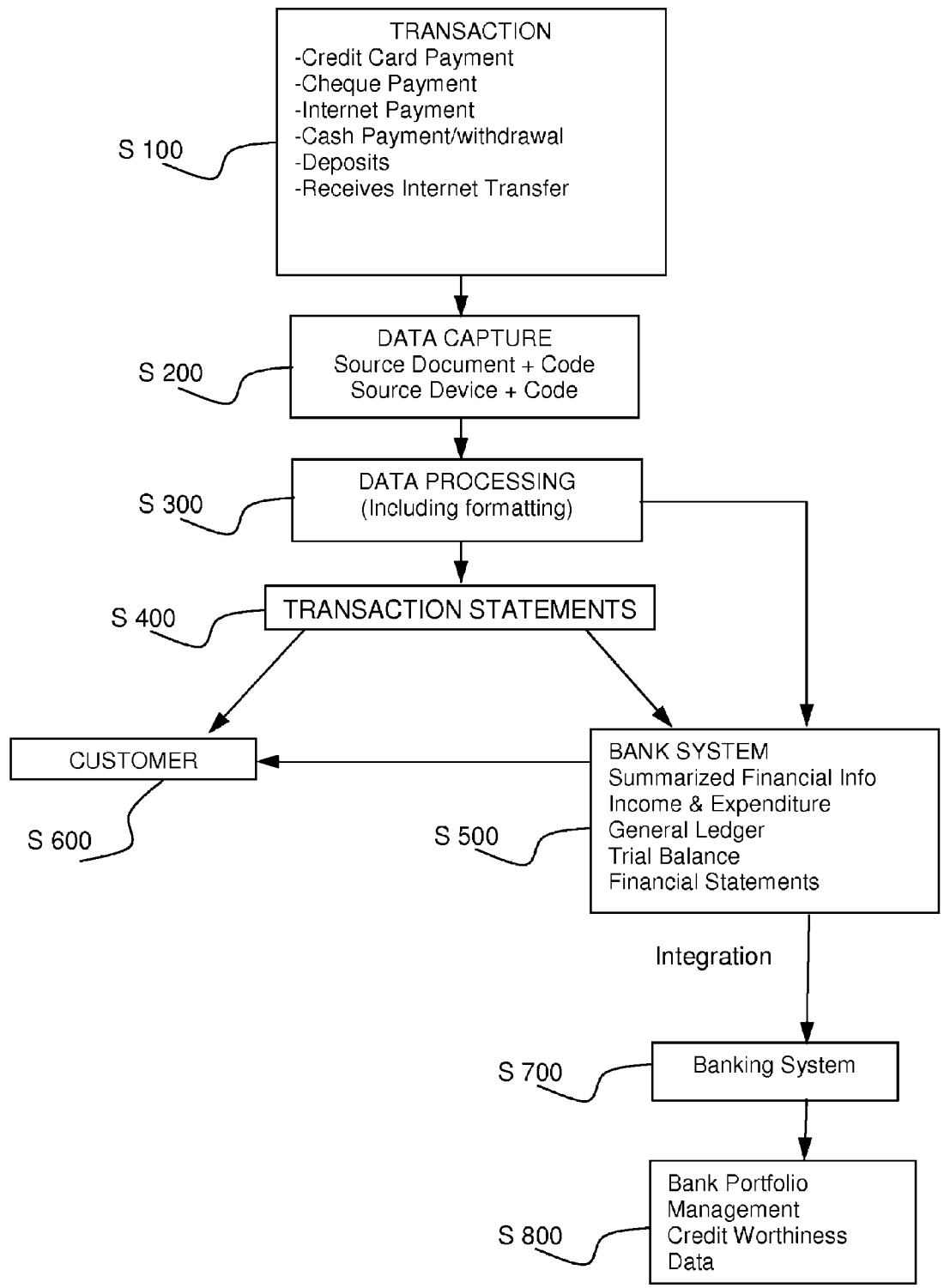
FIG. 1 is a flow chart of capturing code and producing accounts.
Figure 2:
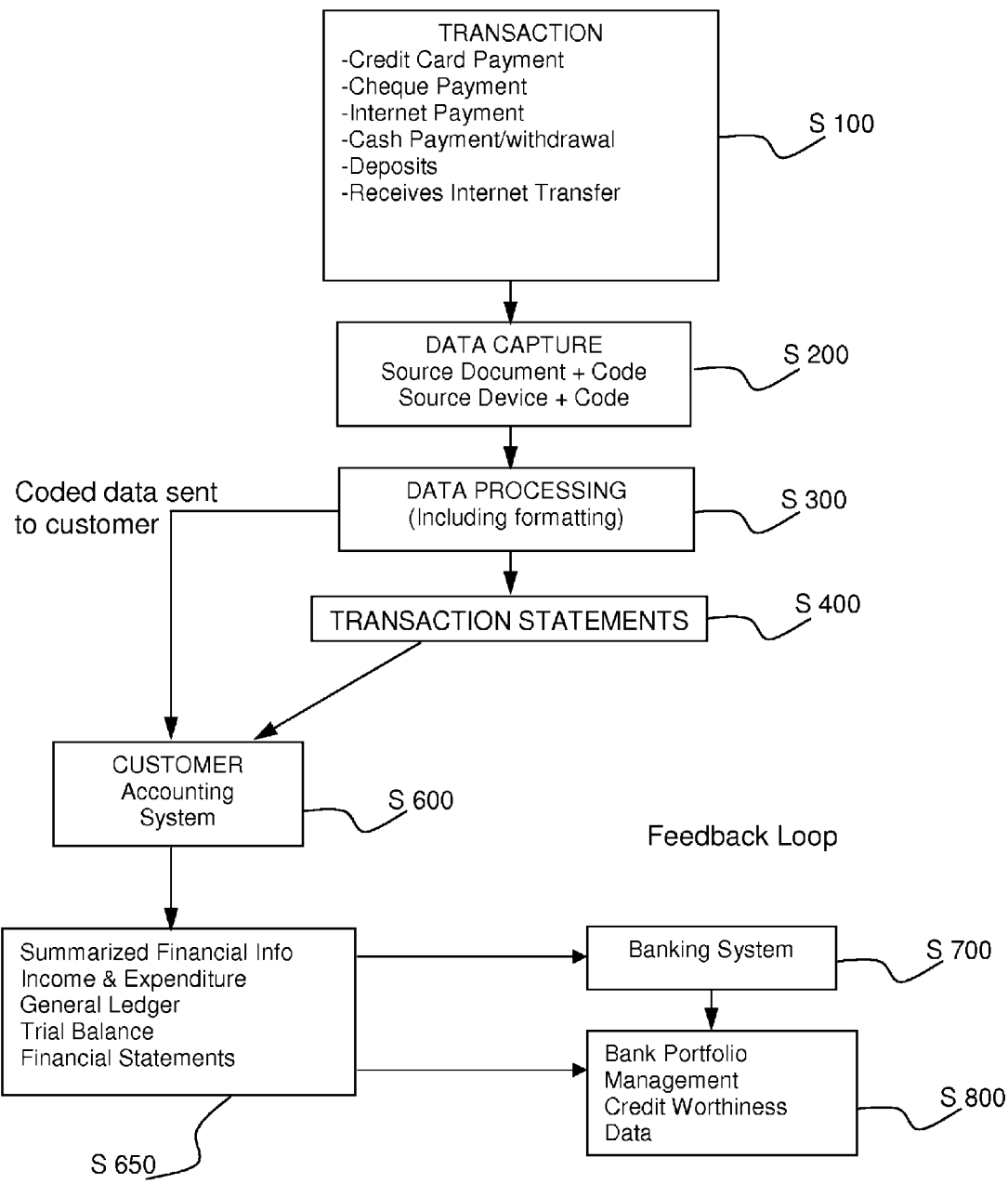
FIG. 2 is a flow chart of data capturing and transfer to customer to produce financial reports.
Figure 3:
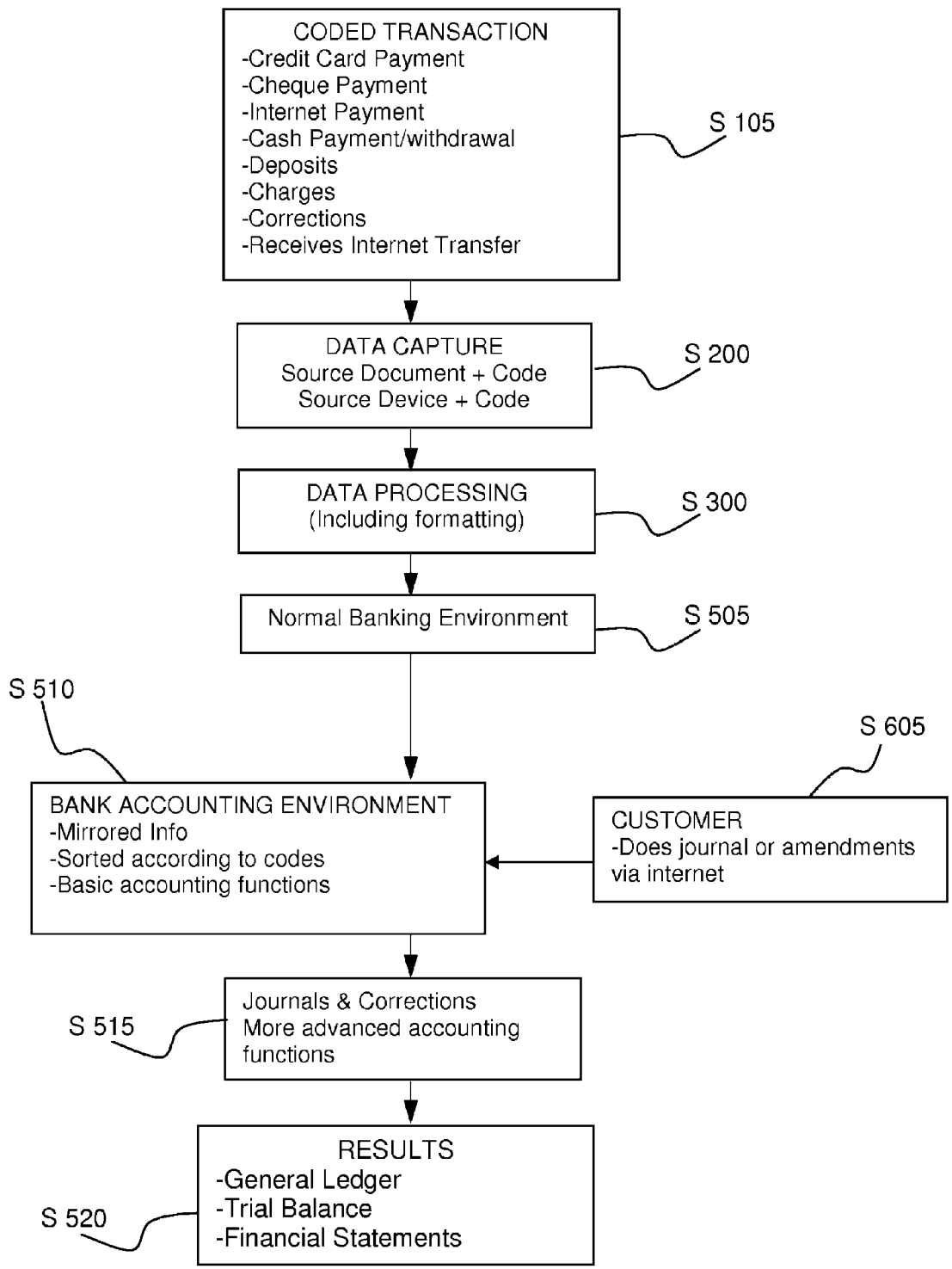
FIG. 3 is a flow chart of bank capturing data and transferring to bank to produce financial reports.
Figure 4:
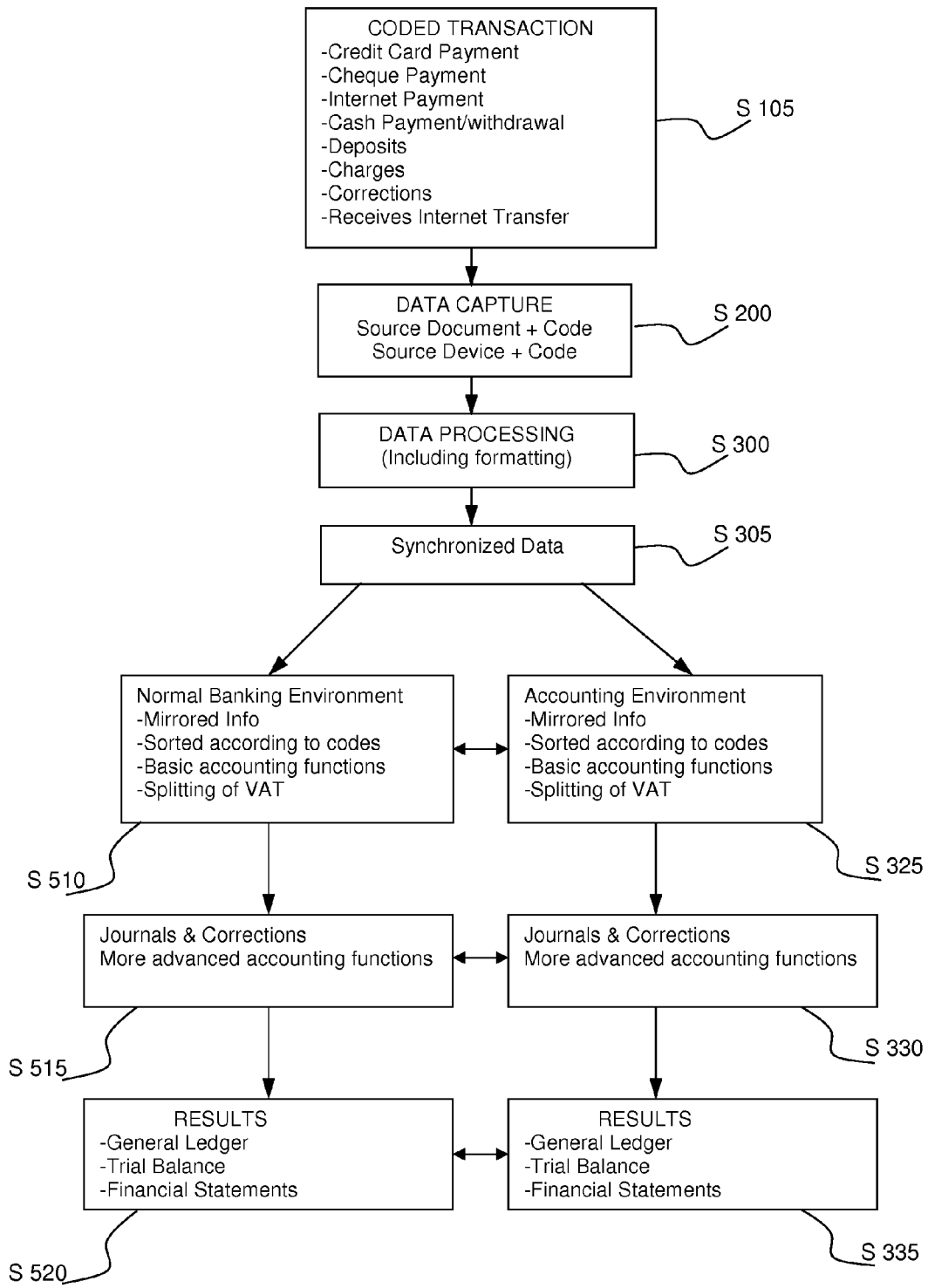
FIG. 4 is a flow chart of bank capturing data and transferring to customer, customer capturing data and transferring to bank, bank and customer data synchronized and mirrored in bank and accounting environment.

The operation of the accounting process of the invention may be illustrated with reference to the accompanying diagrams FIGS. 1 to 4. FIG. 1 shows capturing code and producing accounts for individuals or a small business bank system. FIG. 2 shows data capturing and transfer to customer to produce financial reports for large corporations and individuals. FIG. 3 shows a bank capturing data and transferring to the bank to produce financial reports. FIG. 4 shows a bank capturing bank-related data and transferring that data to a customer; the customer capturing customer-related data and transferring that data to the bank; and the bank data and the customer data being synchronized and mirrored in the bank and accounting environment.

Figure 5:
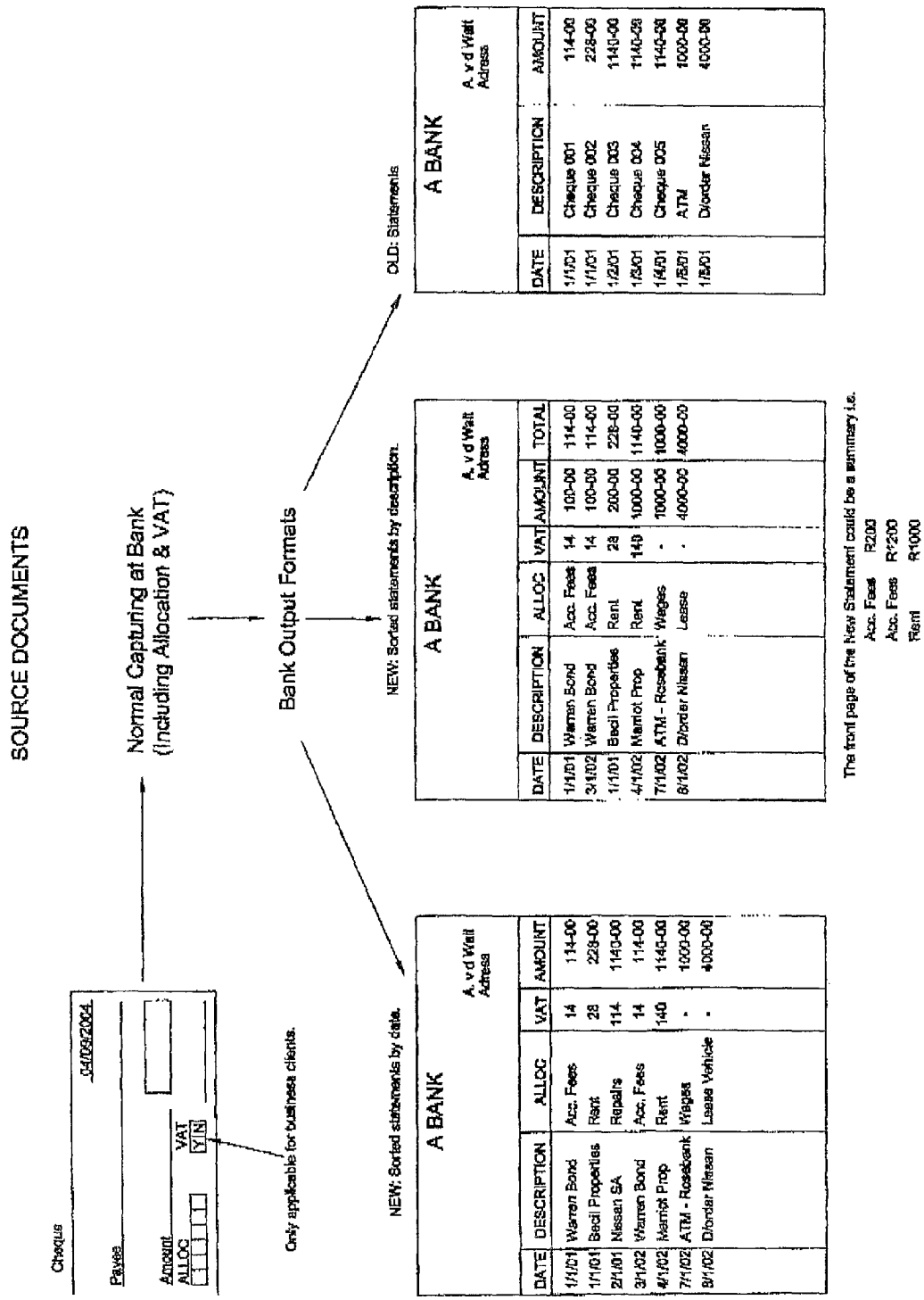
Figure 6:
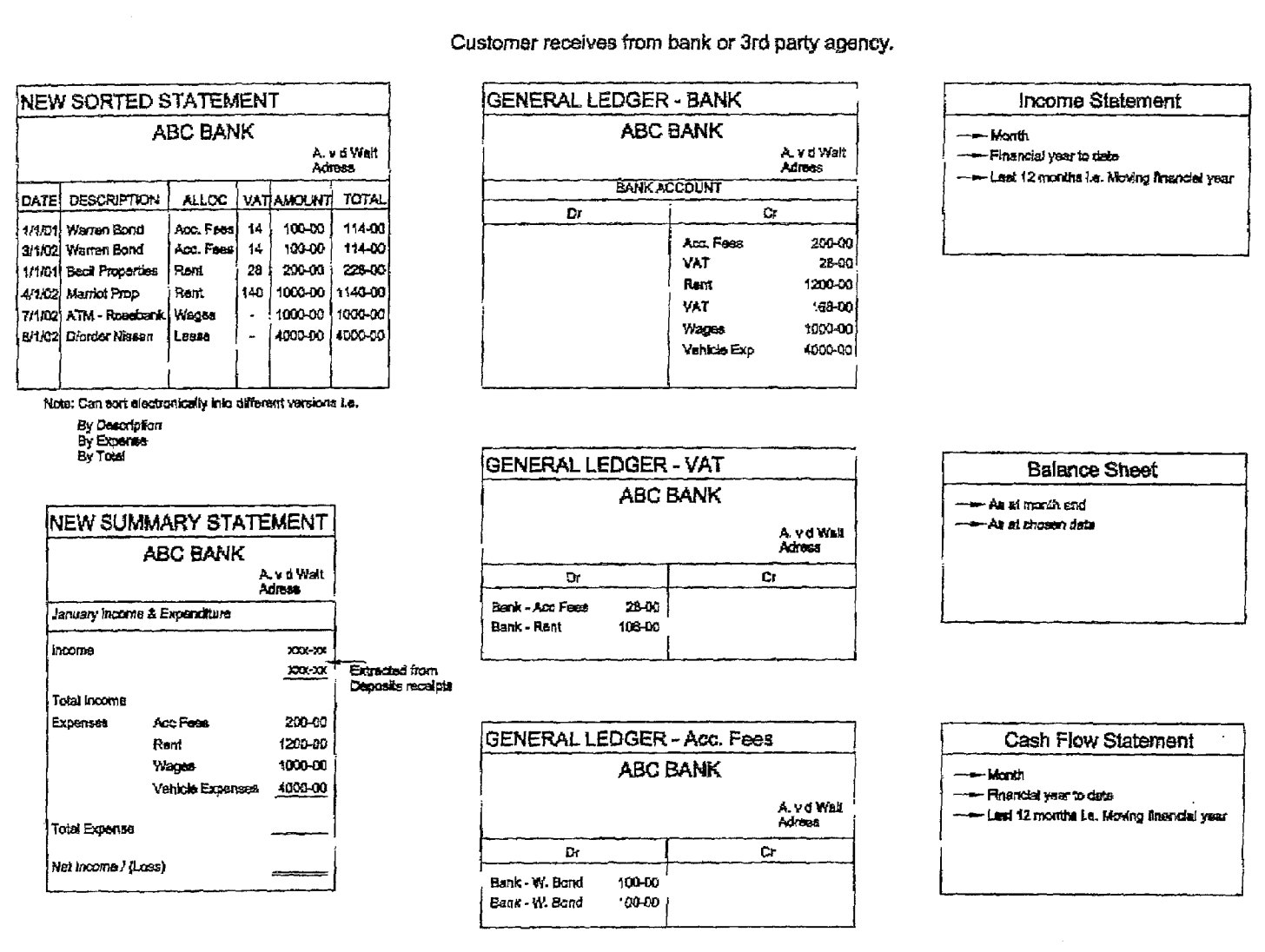

FIGS. 5 and 6 illustrate a specific example of a cheque as a source document, and the illustration of examples of accounting information which may be generated using the system of the invention.

With reference to FIG. 1, there is detailed Example 1 of an embodiment of the invention for individuals or small businesses. In step S100 there is a transaction that takes place, e.g., credit card payment, cheque payment, internet payment, cash payment/withdrawal, deposites, and receiving an internet transfer. In step S200 there is a data capture which may use a source document and code and a source device and code.

In step S300 there is data processing, including formatting. Step S400 shows transaction statements. This step follows step S300. The step S500 shows the bank system, summarized financial information, income and expenditure, general ledger, trial balance, financial statements. Step S500 is shown as following either of steps S300 and S400.

Step S600 shows the customer following either of the steps S400 and S500.

By integration, step S700 follows step S500 so that the information from step S500 is introduced into the banking system and supplied to the bank portfolio data, management data, credit worthiness data at step S800.

In summary, the bank captures data, and produces accounting information and reports for the customer.

With reference to FIG. 2, there is detailed an Example 2 embodiment of the invention for small-medium businesses, individuals or large corporates where the bank captures data, and software synchronizes it before transferring the data to the customer's accounting system for the customer's system to produce accounting info and reports.

Similar to the embodiment of FIG. 1, in step S100 there is a transaction that takes place, e.g., credit card payment, cheque payment, internet payment, cash payment/withdrawal, deposites, and receiving an internet transfer. In step S200 there is a data capture which may use a source document and code and a source device and code.

In step S300 there is data processing including formatting, including formatting. Step S400 shows transaction statements. This step follows step S300.

Step S600 shows the customer accounting system following either of the steps S300 and S400. In this embodiment coded data is sent to the customer from step S300.

Step 650 provides summarized financial information, income and expenditure, general ledger, trial balance, and financial statements.

In this embodiment there is a feedback loop shown. See steps S700 and S800 whereby the banking system is connected at an output of step S650. In this embodiment, step S800 directly follows each of steps S650 and shows the bank portfolio data, management data, credit worthiness data at step S800.

FIG. 3 shows Example 3 where the bank captures data, and the customer also captures data such as journals and corrections, this appropriately formatted information is then sent to bank which produces accounting information and reports.

In steps S105, S200, and S300 there is respectively a transaction that takes place, data capture, and data processing including formatting, including formatting. See that step S105 refers to coded transactions and includes charges and corrections.

In this embodiment step S505 refers to the normal banking environment, and step S510 the bank accounting environment which includes mirrored information that is sorted according to codes, and basic accounting functions. Step S605 shows the customer doing journal or amendments via the internet. By step S605 inputting into step S510, there is the capture of the customer's input data.

Step S515 follows step S510 and shows journals and corrections, as well as more advanced accounting functions. Step S515 feeds into step S520 which is Results including general ledger, trial balance, and financial statements.

Thus, through these steps the bank captures data or the customer captures data and transfers the captures data to the bank so that the bank can produces financial reports.

The embodiment of FIG. 4 shows Example 4 where the bank captures data, and the customer also captures data such as journals and corrections, the data is formatted and the information/data is synchronized between the accounting systems of the customer and the bank. In other words, the Customer produces accounting info and reports, and this can be mirrored on both bank and customer system.

As in FIG. 3, steps S105, S200, and S300 there is respectively a transaction that takes place, data capture, and data processing including formatting, including formatting.

In this embodiment step S305 refers to the data being synchronized.

As to the normal banking environment, see step S510 which includes mirrored information that is sorted according to codes, basic accounting functions, and also splitting of VAT. Steps 515 and S520 follow step S510.

Steps S325, S330, and S335 are bidirectionally linked respectively to each of Steps S510, S515, and S520 (as shown in FIG. 4) so that bank and customer data issynchronized and mirrored in the bank and the accounting environment.

As noted above, FIGS. 5 and 6 illustrate a specific example of a cheque as a source document. There is also the illustration of examples of accounting information which may be generated using the system of the invention.

A number of advantages are apparent to both the client and to the bank as follows:

1) The bank is able to provide the client with not only a statement of transactions, but also summarized financial information, accounting reports and financial statements, while permitting integration of the financial statements into the banking system for up to date or even real-time monitoring of client credit-worthiness.

2) The bank is able to generate additional income for this service which may take the form of a monthly administration fee or a per-transaction charge.

3) The client automatically keeps up-to-date accounts.

4) Customer capturing is reduced.

According to another aspect of the invention, in order to execute the embodiments disclosed above, there is provided a computer readable memory, encoded with data representing a computer program which is usable to direct a programmable device comprising means for inputting transaction data and a code allocated thereto, means for synchronizing the data and code to ensure compatability with accounting software programs and means for importing and/or exporting the synchronizing data into one or more accounting software programs.

The means for inputting transaction data may be a computer, cell phone, automatic teller machine or credit card machine or the like, including but not limited to:
Internet Banking Website
Website
HTML enabled software
E-Mail
Payment Transaction Acquiring device
Point of Sale Terminal
Magstripe Card Reader
Debit Cards
Credit Cards
Smartcards
Bank Issued Cards
Loyalty Cards
GSM Devices
GPRS Devices
3G Devices
Mobile Phones
Mobile Phone technology enabled readers
SIM Cards
SIM Card Readers
Fixed Line Phone
SMS
MMS
Set Top Box
Debit Order
Stop Order
Cheques
Cheque Requisitions
Deposit Slips
EFT Slips
Inter Account Transfer Slips
Bank Generated Transactions
Bank Draft
Electronic Payment Systems
ATM's
Bank—over the counter transactions
Ban—Virtual Transactions
Telex
Swift
Bank Systems
Clearing Houses
Networks In one embodiment of the invention, additional means may be provided to generate a general ledger and/or trial balance prior to export. In the simplest form, where the software of the invention does not have accounting functionality (i.e. it simply permits data input and formatting, before exporting), then the means for generating the general ledger or other reports may comprise an accounting software program.

In a further embodiment of the invention, further additional means may be provided to generate financial statements prior to export. In this situation, where the software of the invention is not accounting software, it may include a module or functionality for processing the inputted data into financial statements. It may include typical management accounting information as well as graphs.

According to a further aspect of the invention, there is provided a computer program element comprising computer program code means to cause the computer to execute a procedure to import transaction data linked to a transaction code from an input device, synchronize the data to ensure compatability with one or more accounting programs, and to import and/or export the synchronized data to one or more accounting programs.

According to a still further aspect of the invention, there is provided a method, apparatus or program for inputting business transaction data together with a transaction code, comprising:

a central controller including a central processing unit (CPU) and a memory operatively connected to the CPU, at least one terminal adapted for communicating with the central controller, for transmitting and/or receiving transaction data and one or more transaction codes, the memory in the controller containing a program adapted to be executed by the CPU for synchronizing the data to ensure compatability with a variety of accounting software programs, wherein the central controller is adapted to transmit the synchronized data to the same or different terminals for generation of a general ledger, trial balance and other financial statements.

In all of the above embodiments of the invention, the transaction code allocated to each transaction may include a subcode to indicate whether or not the transaction is subject to Value Added Tax, General sales tax or other taxation. Alternatively, each transaction may be allocated a second code for this purpose.

The allocated transaction code may further comprise a specific code, for example, electricity, groceries, entertainment or vendor specific code may be used for example, Escom (trademark), Telkom (trademark), Woolworths (trademark). Alternatively, if a code is not specified a default code is used, for example entertainment.

The invention claimed is:

1. A computerized system for generating a financial statement from bank-held accounts information, the system comprising:

a first part for a bank to store inputted transaction data from a transaction source document, the stored transaction data relating to a banking transaction based on the transaction source document;

a second part used by the bank customer so that the bank customer enters transaction codes, at the time of the banking transaction and as part of the banking transaction, the customer-entered transaction codes identifying accounting interest characteristics of the transaction, the first and second parts being connected, the first part storing the customer-entered transaction codes;

a computer-based accounting system connected to the first part and connected to the second part and accessing the stored transaction data and the stored transaction codes; and the accounting system configured for generating a financial statement utilizing the accessed stored transaction data and the accessed stored transaction codes in response to a computer request from one of the customer and the bank, the accounting system being configured to generate the financial statement avoiding the need to enter the customer-entered transaction codes subsequent to the time of the banking transaction, wherein the first part comprise least i) a central controller including a central processing unit (CPU) and a memory operatively connected to the CPU, and ii) at least one terminal operable by the customer and adapted for communicating with the central controller, the terminal transmitting the transaction data to the central controller, and wherein the second part comprises the at least one terminal operable by the customer and adapted for communicating with the central controller located at a banking institution, the at least one terminal configured to at least one of proactively and reactively interact with the customer for entry of the transaction codes.

2. The system of claim 1, wherein, the financial statement is selectable by the bank to be any one of a detailed statement of transactions, a summarized financial information, an accounting report, a financial statement, a customer creditworthiness report, income statements, a cash flow statement, a tax report, and balance sheets.

3. The system of claim 1, wherein, the accounting system comprises stored customer accounting records, and the accounting system is configured to generated the financial statement by synchronizing the stored transaction data with the stored customer accounting records.

4. The system of claim 1, wherein, the stored transaction data of the first part includes journals and corrections, the accounting system comprises stored customer accounting records, and the accounting system is configured to generated the financial statement by synchronizing the stored transaction data with the stored customer accounting records to produce a corrected journal for the customer, the accounting system exports the corrected journal to the bank and the customer.

5. A non-transitory program storage medium readable by a computer, storing a program of instructions executable by the computer to control the computer to function as a computerized system for generating a financial statement from bank-held accounts information, the system comprising:

a first part for a bank to store inputted transaction data from a transaction source document, the stored transaction data relating to a banking transaction based on the transaction source document; and a second part used by the bank customer so that the bank customer enters transaction codes, at the time of the banking transaction and as part of the banking transaction, the customer-entered transaction codes identifying accounting interest characteristics of the transaction, the first and second parts being connected, the first part storing the customer-entered transaction codes, wherein the first part comprise least i) a central controller including a central processing unit (CPU) and a memory operatively connected to the CPU, and ii) at least one terminal operable by the customer and adapted for communicating with the central controller, the terminal transmitting the transaction data to the central controller, and wherein the second part comprises the at least one terminal operable by the customer and adapted for communicating with the central controller located at a banking institution, the at least one terminal configured to at least one of proactively and reactively interact with the customer for entry of the transaction codes the first part and the second part configured for interacting with a computerized accounting system connected to the first part and connected to the second part and accessing the stored transaction data and the stored transaction codes, the accounting system configured to generate a financial statement utilizing the accessed stored transaction data and the accessed stored transaction codes in response to a computer request from one of the customer and the bank, the accounting system being configured to generate the financial statement while avoiding the need to enter the customer-entered transaction codes subsequent to the time of the banking transaction.

6. The system of claim 1, wherein, the at least one terminal is one of a computer, a cell phone, an automatic teller machine, and a credit card machine.

7. The system of claim 1, wherein, the customer is one of an individual and a business, the financial statement is selectable by the customer to be any one of a detailed statement of transactions, a summarized financial information, an accounting report, and a financial statement.

8. The system of claim 1, wherein, the stored transaction data of the first part and the customer-entered transaction codes identifying accounting interest characteristics of the stored transaction data are information stored in the same database.

9. The system of claim 1, wherein, the first part with the stored transaction data and the second part providing the customer-entered transaction codes identifying accounting interest characteristics of the captured transaction data are telecommunicably linked.

10. The system of claim 1, wherein, the accounting system is telecommunicably connected to the first part and telecommunicably connected to the second part and accessing the stored transaction data and the stored transaction codes telecommunicably.

11. The system of claim 2, wherein, the first part with the stored transaction data and the second part providing the customer-entered transaction codes identifying accounting interest characteristics of the captured transaction data are telecommunicably linked.

12. The system of claim 1, wherein, the transaction codes identifying accounting interest characteristics of the stored transaction data include at least one of accounting transaction data and sales tax data, and are inserted as an additional reference field dedicated for the accounting system to generate the financial statement utilizing the accessed stored transaction data and the accessed stored transaction codes in response to the computer request from one of the customer and the bank.

13. The system of claim 1, wherein, the transaction codes identifying accounting interest characteristics of the stored transaction data, entered by the bank customer at the time of the banking transaction and as part of the banking transaction, includes sales tax data inserted as an additional reference field dedicated for the accounting system to generate the financial statement utilizing the accessed stored transaction data and the accessed stored transaction codes in response to the computer request from one of the customer and the bank.

14. The system of claim 1, wherein, the financial statement is selectable by the customer to be any one of a detailed statement of transactions, a summarized financial information, an accounting report, a financial statement, a customer credit-worthiness report, income statements, a cash flow statement, a tax report, and balance sheets.

15. The system of claim 1, wherein,
the transaction codes included at least one code entered by the customer in a field of a check or deposit slip for use as an additional reference field dedicated for the accounting system to generate the financial statement utilizing the accessed stored transaction data and the accessed stored transaction codes in response to the computer request from one of the customer and the bank.

16. The system of claim 1, wherein, the stored
transaction data of the first part and the customer-entered transaction codes identifying accounting interest characteristics of the stored transaction data are information stored in different databases.

17. The system of claim 1, wherein,
the transaction codes included at least one code entered by the customer in a field identified for use as an additional reference field dedicated for the accounting system to generate the financial statement utilizing the accessed stored transaction data and the accessed stored transaction codes in response to the computer request from one of the customer and the bank, and
the at least one code entered by the customer in the field is an indication whether the banking transaction is subject to tax.

18. The system of claim 17, wherein the tax is one of a Value Added Tax, a general sales tax, and a tax other than the Value Added Tax and the general sales tax.

19. A computerized system for generating a financial statement from bank-held accounts information, the system comprising:
a first part for a bank to store inputted transaction data from a transaction source document, the stored transaction data relating to a banking transaction based on the transaction source document;
a second part used by the bank customer, at the time of the banking transaction, so that the bank customer enters transaction codes identifying accounting interest characteristics of the transaction including entering a code into a field dedicated for report generation, the first part and the second part being connected, the first part storing the customer-entered transaction codes;
a computerized accounting system connected to the first part and connected to the second part and accessing the stored transaction data and the stored transaction codes; and
the accounting system configured for generating a financial statement utilizing the accessed stored transaction data and the accessed stored transaction codes in response to a computer request from one of the customer and the bank,
wherein the code entered into the field dedicated for report generation indicates whether the banking transaction is subject to tax, and is used as an additional reference field dedicated for the accounting system to generate the financial statement utilizing the accessed stored transaction data and the accessed stored transaction codes in response to the computer request from one of the customer and the bank, the accounting system being configured to generate the report avoiding the need to enter the customer-entered transaction codes subsequent to the time of the banking transaction,
wherein the first part and the second part comprise least i) a central controller including a central processing unit (CPU) and a memory operatively connected to the CPU, and ii) at least one terminal operable by the customer and adapted for communicating with the central controller, the terminal transmitting the transaction data and the transaction codes to the central controller, the at least one terminal configured to at least one of proactively and reactively interact with the customer for entry of the transaction codes.

20. The system of claim 19, wherein the tax is one of a Value Added Tax, a general sales tax, and a tax other than the Value Added Tax and the general sales tax.

21. The system of claim 20, wherein,
the accounting system is telecommunicably connected to the first part and telecommunicably connected to the second part, the accounting system accessing the stored transaction data and the stored transaction codes telecommunicably from the first part.

22. The system of claim 21, wherein,
the first part with stored transaction data and the second part with transaction codes identifying accounting interest characteristics of the stored transaction data are telecommunicably linked.

23. The system of claim 17, wherein,
the financial statement is selectable by either of the bank and the customer and is any one of a detailed statement of transactions, a summarized financial information, an accounting report, a financial statement, a customer credit-worthiness report, income statements, and balance sheets,
the first part comprises the at least one terminal operable by the customer and adapted for communicating with the central controller located at a banking institution, and
the at least one terminal may either proactively and reactively interact with the customer for entry of the transaction data.

24. A computerized system for generating a financial statement from bank-held accounts information, the system comprising:
a first part for a bank storing inputted transaction data from a transaction source document, the stored transaction data relating to a banking transaction based on the transaction source document;
a second part used by the bank customer so that, at the time of the banking transaction and as part of the banking transaction, the bank customer allocates a transaction code identifying an accounting interest characteristic of the banking transaction, the first and second parts being connected at the time of the transaction via the internet, the first part storing the customer-allocated transaction codes subsequent to the time of the banking transaction, the banking transaction being an internet banking payment;
a computerized accounting system connected to the first part and connected to the second part and accessing the stored transaction data and the stored transaction codes; and
the accounting system configured for generating a financial statement utilizing the accessed stored transaction data and the accessed stored transaction codes in response to a computer request from one of the customer and the bank, the accounting system being configured to generate the financial statement avoiding the need to enter the customer-allocated transaction codes subsequent to the time of the banking transaction, wherein the first part and the second part comprise least i) a central controller including a central processing unit (CPU) and a memory operatively connected to the CPU, and ii) at least one terminal operable by the customer and adapted for communicating with the central controller, the terminal transmitting the transaction data and the transaction codes to the central controller, the at least one terminal configured to at least one of proactively and reactively interact with the customer for entry of the transaction codes.

* * * * *